(12) United States Patent
Owsley et al.

(10) Patent No.: US 8,824,571 B1
(45) Date of Patent: Sep. 2, 2014

(54) TELECOMMUNICATION BLOCK CODE

(75) Inventors: Patrick Owsley, Moscow, ID (US);
Brian A. Banister, Moscow, ID (US)

(73) Assignee: Comtech EF Data Corp., Tempe, AZ (US)

(*) Notice: Subject to any disclaimer, the term of this patent is extended or adjusted under 35 U.S.C. 154(b) by 774 days.

(21) Appl. No.: 12/714,224

(22) Filed: Feb. 26, 2010

Related U.S. Application Data (60) Provisional application No. 61/158,226, filed on Mar. 6, 2009.

(51) Int. Cl.
*H04L 27/00* (2006.01)

(52) U.S. Cl.
USPC .......................................................... 375/259

(58) Field of Classification Search
CPC .... H04L 1/0057; H04L 1/007; H04L 27/2675
USPC .......................... 375/259, 260, 295, 316, 219
See application file for complete search history.

(56) References Cited

U.S. PATENT DOCUMENTS

| | | | |
|---|---|---|---|
| 2002/0106004 A1* | 8/2002 | Tan ................................ | 375/140 |
| 2003/0097623 A1* | 5/2003 | Razavilar et al. ............. | 714/704 |
| 2004/0194008 A1* | 9/2004 | Garudadri et al. ............ | 714/821 |
| 2005/0055387 A1* | 3/2005 | Kuekes et al. .................... | 708/1 |
| 2009/0022087 A1* | 1/2009 | Dankberg et al. ............. | 370/316 |

FOREIGN PATENT DOCUMENTS

| WO | 2009131252 | 10/2009 |
|---|---|---|

OTHER PUBLICATIONS

Bassalygo et al., Bounds for codes with unequal protection of two sets of messages, Problemy Peredachi Infomatsii, vol. 15, No. 3, pp. 40-49, 1979.
Zinov'Ev et al., Codes with unequal protection of information symbols, Problemy Peredachi Infomatsii, vol. 15, No. 3, pp. 50-60, 1979.
Borade, Shashi and Sanghavi, Sujay, Some fundamental coding theoretic limits of unequal error protection, ISIT 2009, Seoul, Korea.
Borade, Shashi, Unequal error protection: an information-theoretic perspective, IEEE Transactions on Information Theory, vol. 55, No. 12, 2009.

* cited by examiner

*Primary Examiner* — Kevin M Burd
(74) *Attorney, Agent, or Firm* — Booth Udall Fuller, PLC (57) ABSTRACT

Methods of transmitting and recovering data traversing a telecommunication channel. Implementations may include forming a first frame of a plurality of frames using a frame module where the first frame includes a first control codeword including information relating to a first format used for a first data payload included in the first frame and where the first control codeword is selected from a non-linear block code and has a first distance spectrum. The method may include forming a second frame of the plurality of frames using the frame module where the second frame includes a second control codeword selected from the non-linear block code and has a second distance spectrum where the second distance spectrum is different from the first distance spectrum. The method may also include transmitting the plurality of frames into a telecommunication channel using a frame transmission module.

20 Claims, 8 Drawing Sheets

TELECOMMUNICATION BLOCK CODE

CROSS REFERENCE TO RELATED APPLICATIONS

This document claims the benefit of the filing date of U.S. Provisional Patent Application 61/158,226, entitled "Telecommunication Block Code" to Banister et al., which was filed on Mar. 6, 2009, the disclosure of which is hereby incorporated entirely herein by reference.

BACKGROUND

1. Technical Field

Aspects of this document relate generally to telecommunication systems and related methods for encoding and transmitting data across a telecommunication channel.

2. Background Art

In many telecommunications systems, data and information is transmitted across a telecommunications channel (wired or wireless) by being modulated onto a carrier wave signal. At the destination point, a demodulator is used to process the received signal and recover the data. Many techniques have been devised to ensure that the data can be robustly communicated across the telecommunication channel and subsequently recovered from the carrier wave signal, despite various distorting and interfering characteristics of the channel through which the signal passes. A wide variety of encoding methods, such as forward error correction (FEC) encoding, have been devised that encode the data prior to modulation on the carrier wave using algorithms that ensure that the complete data can be recovered from just a portion of the encoded data if part of the transmission is lost or corrupted during transmission across the channel.

SUMMARY

Implementations of a first method of transmitting and recovering data traversing a telecommunication channel may include forming a first frame of a plurality of frames using a frame module where the first frame includes a first control codeword including information relating to a first format used for a first data payload included in the first frame and where the first control codeword is selected from a non-linear block code and has a first distance spectrum. The method may include forming a second frame of the plurality of frames using the frame module where the second frame includes a second control codeword selected from the non-linear block code and has a second distance spectrum where the second distance spectrum is different from the first distance spectrum. The method may also include transmitting the plurality of frames into a telecommunication channel using a frame transmission module.

Implementations of a first method of transmitting and recovering data traversing a telecommunication channel may include one, all, or any of the following:

Forming the second frame of the plurality of frames may further include wherein the first control codeword has a strength that is equal to, greater than, or less than a strength of the second control codeword.

Forming the second frame of the plurality of frames may further include wherein the first distance spectrum has a minimum Hamming distance that is larger than the minimum Hamming distance of the second distance spectrum.

Forming the second frame including the second preamble including the second ModCod may further include where the first codeword is stronger or weaker than the second codeword.

The method may further include receiving the plurality of frames with a receiver module and recovering the data from the first data payload and the second data payload using the control codeword and the second control codeword, respectively, and using a retrieval module.

Implementations of a second method of transmitting and recovering data traversing a telecommunication channel may include forming a first frame and a second frame of a plurality of frames by encoding a first predetermined quantity of data using one or more first coding parameters and an encoder to form a first encoded quantity of data. The method may include modulating the first encoded quantity of data using a first modulation format and a modulator to form a first data payload included in the first frame of the plurality of frames and forming a first modulation/code pair (ModCod) including information relating to the one or more first coding parameters and the first modulation format used to encode the first predetermined quantity of data in the first data payload and associating the first ModCod with a first codeword of a non-linear block code, the first codeword having a first distance spectrum. The method also may include encoding a second predetermined quantity of data using one or more second coding parameters and the encoder to form a second encoded quantity of data and modulating the second encoded quantity of data using a second modulation format and the modulator to form a second data payload included in the second frame of the plurality of frames. The method may also include forming a second ModCod including information relating to the one or more second coding parameters and the second modulation format used to encode the second predetermined quantity of data in the second data payload and associating the second ModCod with a second codeword of the non-linear block code, the second codeword having a second distance spectrum different from the first distance spectrum. The method may also include transmitting the plurality of frames into a telecommunication channel using a transmitter.

Implementations of a second method of transmitting and recovering data traversing a telecommunication channel may include one, all, or any of the following:

Forming the second ModCod may further include where the second ModCod has a strength that is equal to, greater than, or less than a strength of the first ModCod.

Forming the second ModCod may further include where the first distance spectrum has a minimum Hamming distance larger or smaller than a minimum Hamming distance of the second distance spectrum.

Forming the second ModCod and including the second ModCod in the second codeword of the block code may further include where the first codeword is stronger or weaker than the second codeword.

The method may further include receiving the plurality of frames with a receiver and recovering the data from the first data payload and the second data payload using the first codeword and the second codeword, respectively, and using a demodulator and a decoder.

Implementations of a method of unequally protecting data transmitted across a telecommunication channel may include receiving a first quantity of data and a second quantity of data where the first quantity of data has a higher importance than the second quantity of data. The method may also include encoding and modulating using an encoder and modulator the first quantity of data into one or more first frames each including a first ModCod having a first strength where the first ModCod is associated with a first codeword of a non-linear block code, the first codeword having a first distance spectrum. The method may also include encoding and modulating using an encoder and modulator the second quantity of data into one or more second frames each including a second ModCod having a second strength. The second ModCod may be associated with a second codeword of the non-linear block code and have a second distance spectrum different from the first distance spectrum.

Implementations of a method of unequally protecting data transmitted across a telecommunication channel may include one, all, or any of the following:

Encoding and modulating, using the encoder and modulator, the second quantity of data into one or more second frames may further include where the first strength of the first ModCod is equal to, greater than, or less than the second strength of the second ModCod.

Encoding and modulating, using the encoder and modulator, the second quantity of data into one or more second frames may further include wherein a minimum Hamming distance of the first distance spectrum is larger or smaller than a minimum Hamming distance of the second distance spectrum.

Implementations of method of reducing transmission and reception overhead between a transmitter and a plurality of receivers may include transmitting a telecommunication signal including plurality of frames into a telecommunication channel using a transmitter where each of the plurality of frames includes a codeword having a specified strength from a set of codewords of a non-linear block code. The method may also include receiving and decoding the plurality of frames at a plurality of receivers where when at least one of the plurality of receivers can receive at least a portion of the telecommunication signal but cannot decode the codeword because of distortion or corruption of the codeword caused by the telecommunication channel, the at least one receiver no longer attempts to decode the telecommunication signal.

Implementations of a method of reducing transmission and reception overhead between a transmitter and a plurality of receivers may include one, all or any of the following:

The method may further include transmitting a second telecommunication signal including a plurality of frames into the telecommunication channel using the transmitter where each of the plurality of frames includes a second codeword having a specified strength stronger than the first codeword. The method may also include enabling all of the plurality of receivers to receive and decode the plurality of frames by specifying that the strength of the second codeword is sufficient to allow all of the plurality of receivers to receive and decode the second codeword, notwithstanding any distortion or corruption of the telecommunication signal caused by the telecommunication channel.

The method may further include transmitting a second telecommunication signal including a plurality of frames into the telecommunication channel using the transmitter where each of the plurality of frames includes a ModCod associated with a second codeword where the ModCod has a specified strength stronger than a ModCod associated with the first codeword. The method may further include enabling all of the plurality of receivers to receive and decode the plurality of frames by ensuring that the ModCod included in the second codeword has a sufficient strength to allow all of the plurality of receivers to receive and decode the plurality of frames, notwithstanding any distortion or corruption of the telecommunication signal caused by the telecommunication channel.

Each of the plurality of frames may have an equal length and receiving and decoding the plurality of frames at the plurality of receivers may further include where if the at least one of the plurality of receivers cannot decode the codeword in a received frame because of distortion or corruption of the codeword caused by the telecommunication channel, the at least one receiver no longer attempts to decode that received frame but attempts to decode a subsequent received frame of the plurality of frames.

Each of the plurality of frames may have an equal length and receiving and decoding the plurality of frames at the plurality of receivers may further include maintaining frame synchronization with the plurality of frames using the equal length of each of the plurality of frames and attempting to decode a subsequent received frame of the plurality of frames when the at least one of the plurality of receivers cannot decode the codeword in a received frame because of distortion or corruption of the codeword caused by the telecommunication channel.

Implementations of a method of transmitting data for a side channel across a telecommunication channel may include forming a first frame of a plurality of frames using an encoder and a modulator where the first frame includes a first ModCod having information relating to first coding parameters and a first modulation format used to encode and modulate a first data payload included in the first frame. The first ModCod and a first side channel bit value may be associated with a first codeword of a first pair of codewords of a non-linear block code. The method may include forming a second frame of a plurality of frames using the encoder and the modulator where the second frame includes a second ModCod including information relating to second coding parameters and a second modulation format used to encode and modulate a second data payload included in the second frame. The second ModCod and a second side channel bit value may be associated with a second codeword of the first pair of codewords of the non-linear block code. The method may also include including data for the side channel by setting the value of the first side channel bit value and the value of the second side channel bit value and sending the plurality of frames into a telecommunication channel using a transmitter. The first codeword may have a first Hamming distance to the second codeword and the first pair of codewords may have a second Hamming distance to a second pair of codewords of the non-linear block code where the second Hamming distance is different from the first Hamming distance.

Implementations of a method of transmitting data for a side channel across a telecommunication channel may further include one, all, or any of the following:

The method may further include recovering data for the side channel by retrieving the value of the first side channel bit value and the value of the second side channel bit value from the first codeword and from the second codeword, respectively, using a receiver.

Forming the first frame of the plurality of frames and forming the second frame of the plurality of frames may further include where the second Hamming distance is larger than the first Hamming distance.

Forming the first frame of the plurality of frames and forming the second frame of the second frame of the plurality of frames further includes wherein the second Hamming distance is smaller than the first Hamming distance.

Forming the first frame of the plurality of frames and forming the second frame of the plurality of frames may further include selecting the first codeword and the second codeword from a set of codeword pairs where one or more of the codeword pairs in the set has a Hamming distance between paired codewords that is larger than a Hamming distance between codeword pairs and where one or more of the codeword pairs in the set has a Hamming distance between paired codewords that is smaller than a Hamming distance between codeword pairs.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended telecommunication block code and/or assembly procedures for telecommunication systems utilizing telecommunication block code implementations will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such telecommunications systems, telecommunication block codes, and implementing components, consistent with the intended operation.

Telecommunication block codes are used to provide protection to data being transmitted across a telecommunication channel. In systematic codes, the bits of information are included in encoded data along with redundant encoded bits; in non-systematic codes, the information bits are not included in the code. A wide variety of block codes exist, including, by non-limiting example, Reed-Solomon, Golay, Hamming, BCH, and any other forward error correction (FEC) block code type. Each particular block code has one or more codewords, and the number of codewords depends upon the characteristics of the block code. For example, in a binary linear block code, the number of codewords when k bits of information will be signaled using an N bit code is the sum of each one of the possible $2^k$ possible different N dimensional patterns, and each codeword will have the same set of Hamming distances to all of the other codewords in the block code, or in other words, each codeword has the same distance spectrum. In a non-linear binary block code, the number of codewords is not necessarily a power of two, nor do all the codewords have the same set of Hamming distances to all of the other codewords, in other words, one or more of the codewords may have a different distance spectrum than the others. Any block code also has a certain code rate; the lower the rate, the stronger the code. At low code rates, more redundant information is included in the encoded data, making it less likely that distortions or corruption caused by noise in the telecommunication channel through which the data passes can prevent recovery of the data from what was received.

Figure 1A:
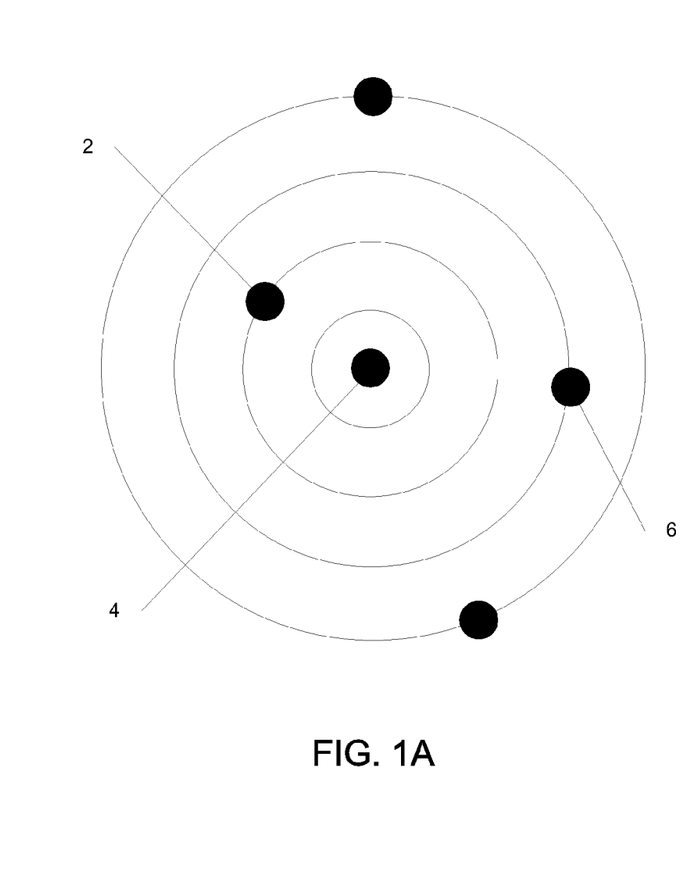
FIG. 1A is a bulls-eye diagram of the codewords of an implementation of a first non-linear block code.

Referring to FIG. 1A, a bulls-eye diagram of the codewords of an implementation of a non-linear block code is illustrated. As illustrated, codeword 2 has a different distance to codeword 4 than codeword 6 does. The distance between the codewords is the Hamming distance. In FIG. 1, codeword 2 has a Hamming distance of two from codeword 4, while codeword 6 has a Hamming distance of three from codeword 4. Because codeword 6 has a larger Hamming distance to codeword 4 than codeword 2 does, it can be referred to as being a stronger codeword relative to codeword 4, because it is less likely to be incorrectly identified as codeword 4 than codeword 2 would be. Correspondingly, codeword 2 would be considered to be weaker than codeword 6 with respect to codeword 4. Codeword 2 also has a different distance spectrum to codeword 4 and the rest of the codewords of the non-linear block code than does codeword 6. Because the minimum Hamming distance of the distance spectrum of codeword 2 is two relative to codeword 4, while the minimum Hamming distance of the distance spectrum of codeword 6 relative to codeword 4 is three, codeword 2 can also be considered to be a weaker codeword than codeword 6 relative to codeword 4.

Figure 1B:
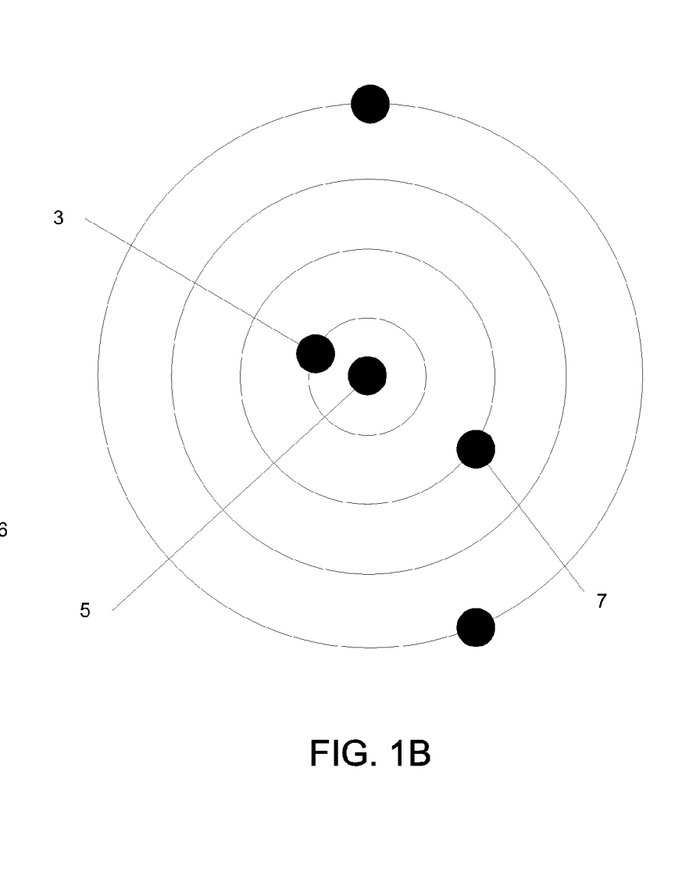
FIG. 1B is a bulls-eye diagram of the codewords of an implementation of a second non-linear block code.

Referring to FIG. 1B, a bulls-eye diagram of another implementation of a non-linear block code is illustrated. As illustrated, codeword 3 has a different Hamming distance to codeword 5 than codeword 7 does. The distance spectrum of codeword 3 is different than the distance spectrum of codeword 7, and because the minimum Hamming distance of the distance spectrum of codeword 3 is smaller (one) to the rest of the codewords than the minimum Hamming distance of the distance spectrum of codeword 7 (two) to the rest of the codewords, then codeword 3 can be said to be stronger than codeword 7. Referring to FIGS. 1A and 1B, codeword 7 may also be said to be stronger than codeword 6, because while the distance spectrum of codeword 6 includes a Hamming distance of three to codeword 4, the minimum distance spectrum of the distance spectrum of codeword six could be considered one, since it is only one away from the codeword on the outer ring. Codeword 7, on the other hand, is a Hamming distance of two from codeword 5 and the two codewords on the outer ring of the diagram. Since codeword 7 has a stronger distance spectrum overall than codeword 6, it may be considered to be a stronger codeword, even though codeword 6 includes a codeword pair with greater separation.

In various telecommunication systems, data that has been encoded using a block code is subsequently modulated onto a carrier wave which is used to carry the data into the telecommunication channel to a receiver. The modulation type can be any of a wide variety of types, including, by non-limiting example, Binary Phase Shift Keying (BPSK), Phase Shift Keying (PSK), Quadrature Amplitude Modulation (QAM), Quadrature Phase Shift Keying (QPSK), Pulse Amplitude Modulation (PAM), and any other modulation type, including variations of each, such as 8-PSK or 16 QAM. In order for the receiver to be able to demodulate and decode the data that has been encoded and modulated, information may be sent with the data that identifies the type of modulation and type of encoding that was used. In implementations of telecommunication systems that employ transmission of data using frames, the modulation and encoding information may be grouped together in a modulation/code pair abbreviated as a ModCod. ModCods can indicate the use of both linear and non-linear block codes; for example, in the Digital Video Broadcasting-Satellite-Second Generation (SVB-S2) specification, there are 24 ModCods that can be used to describe all of the specified modulation/code pairs that are utilized in the specification. A first ModCod generally can be said to be stronger than a second ModCod when the block code of the first ModCod has a lower rate than the block code of the second ModCod. In some implementations, because different modulation types allow for better transfer of particular data types in the presence of certain kinds of noise in a telecommunication channel, a first ModCod may be said to be stronger than a second ModCod when the block codes used in the first and second ModCod have the same rate and when the modulation type used in the first ModCod provides more reliable transfer through the channel than the modulation type of the second ModCod.

Figure 2:
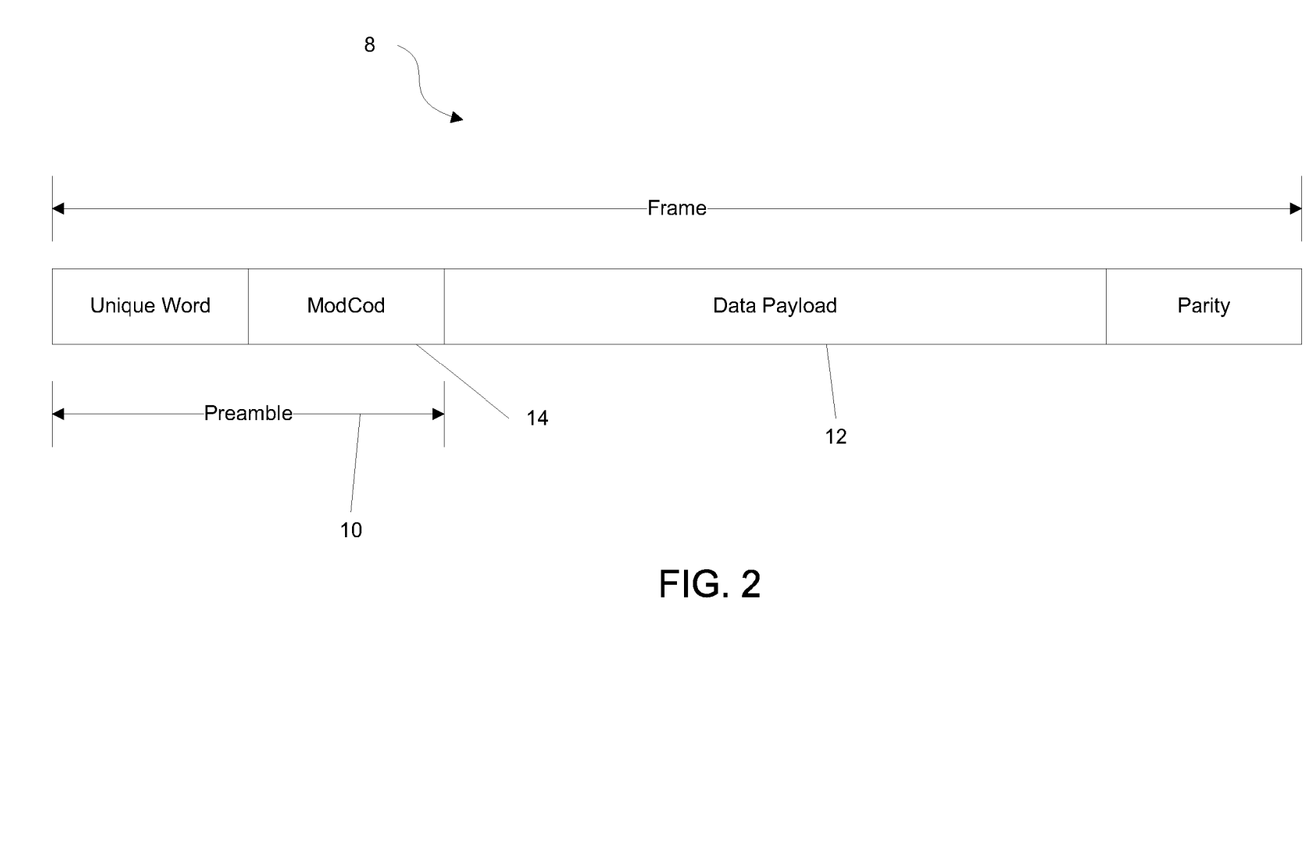
FIG. 2 is a diagram of the structure of a frame.

Referring to FIG. 2, an implementation of a frame 8 is illustrated. As illustrated, the frame 8 includes a preamble 10 that precedes a data payload 12 in a data sequence of the frame 8. Within the preamble 10 is a ModCod 14 that contains code parameters relating to the block code used to encode a quantity of data included in the data payload 12 as well as information relating to the modulation type used to modulate the encoded data included in the data payload 12. While in the implementation of a frame 8 illustrated in FIG. 2, the ModCod 14 is included in the preamble 10, the ModCod may be included in other locations in the data sequence of the frame 8 and a preamble 10 may also not be used. In various implementations of telecommunication systems like those disclosed in this document, the ModCod 14 is or is included in a particular one of the codewords from a non-linear block code. Because the modulation type used to modulate the preamble 10 may be generally different than the modulation type used to modulate the encoded data in the data payload 12, it is important that the receiver be able to demodulate and decode the ModCod 14 included in the codeword in order to demodulate the data in the data payload 12. Because the codewords in the implementation of a non-linear block code used may vary in strength, the strength of the codeword used for a particular ModCod can be specified or chosen to ensure it is (or is not) decoded by a particular receiver. Also, the strength of a particular ModCod can be specified to ensure it is (or is not) decoded by a particular receiver. Once the ModCod has been decoded, the receiver uses the modulation and coding parameter information to recover the data included in the data payload 12. As illustrated, additional portions of the frame 8 may include data used for other functions, such as the identification of the start of the frame 8 (unique word) and as a check of errors that occur as a result of the frame 8 passing through the telecommunication channel (parity).

For linear block codes, the addition of an additional bit of information to be carried in each encoded block increases the overhead of the encoding, and correspondingly increases the number of codewords by a factor of two. Because in a linear block code, all of the codewords have the same distance spectra, all of the codewords have equal strengths. Various implementations of non-linear block codes do not necessarily require the same increase in overhead when an additional bit of information is added to each encoded block; also, because the codewords of a non-linear block code may have different distance spectra, one or more of the codewords vary in strength.

Figure 3A:
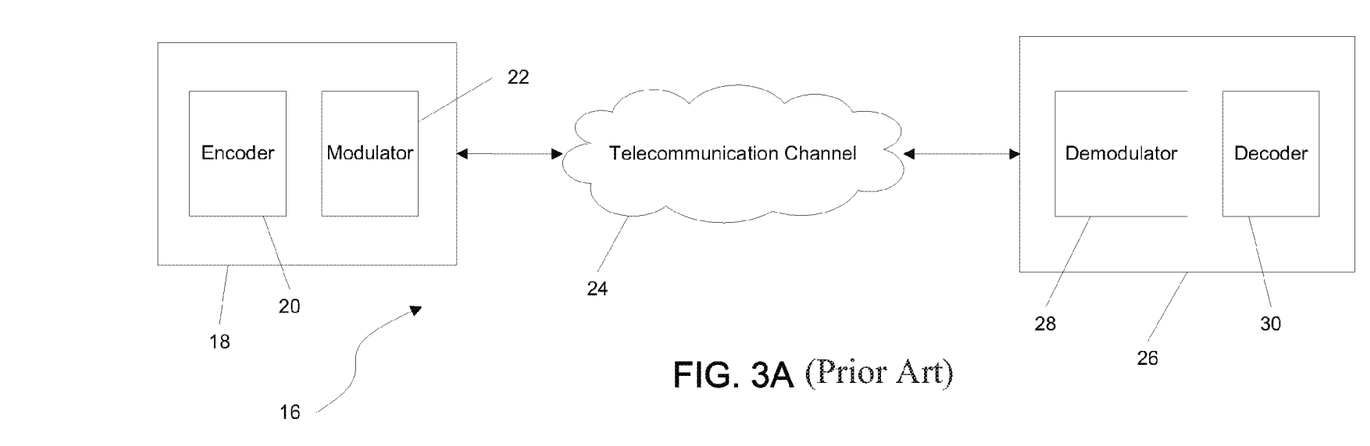
FIG. 3A is a block diagram of an implementation of a transmitter, a telecommunication channel, and a receiver.
Figure 3B:
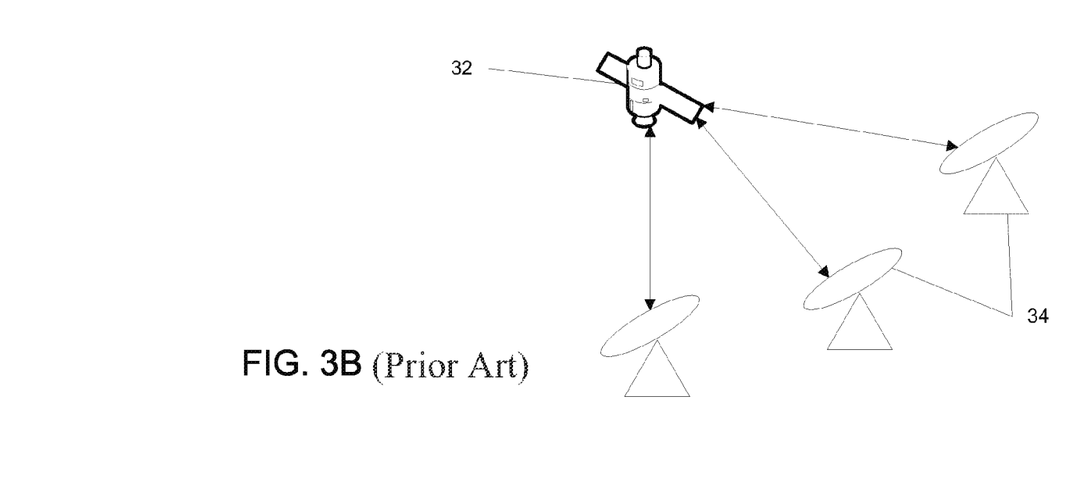
FIG. 3B is a diagram of a satellite in communication with a plurality of receivers across a telecommunication channel.

Referring to FIG. 3A, implementations of telecommunication block codes that include non-linear block codes like those disclosed in this document may be utilized in any of a wide variety of telecommunication systems and operating environments. As illustrated, telecommunication system 16 includes a transmitter 18 that includes an encoder 20 that receives data to be transmitted and encodes it using a block code implementation. The encoded data is then modulated by modulator 22 and transmitted across telecommunication channel 24 as a telecommunication signal to receiver 26. The telecommunication signal is then demodulated by demodulator 28 and decoded by decoder 30 to complete recovery of the data included in the telecommunication signal. While a single transmitter/receiver combination are illustrated in FIG. 3A, FIG. 3B illustrates a satellite communication application where a single satellite 32 is transmitting to a plurality of receivers 34 (hub and spoke) through a telecommunication channel between the satellite 32 and each receiver 34. Because the telecommunication channel between the satellite 32 and each of the plurality of receivers 34 will vary in its distortion and noise characteristics, each receiver 34 has a varying ability to decode the data included in the telecommunication signal received by each receiver 34. The principles disclosed in this document may be employed in any of a wide variety of transmitter/receiver combinations.

Implementations of non-linear block codes like those disclosed in this document may also be used in a wide variety of other implementations. For example, the codewords of a non-linear block code implementation may be used as control codewords in PAM to enable storage, transmission, and retrieval of data from flash memory. Implementations of non-linear block codes with codewords utilized as control codewords like those disclosed herein may also be utilized in, by non-limiting example, storage applications (hard disks, optical drives, magnetic storage), transmission of data across a telecommunication channel (wireless, wired, satellite links), or any other data retrieval, storage, transmission, encoding, decoding, or compression technique, algorithm and/or system. The various block elements illustrated in FIG. 3A, while indicating the components that may be utilized in a telecommunications system application, may be analogized to equivalent components and modules in data storage and/or retrieval systems. For example, a transmitter used in a telecommunications system application would function equivalently with a frame transmission module used in a data storage and/or retrieval system application.

The following is an example of five codewords of a non-linear block code:

A) 0000
B) 1110
C) 0111
D) 1011
E) 1101

By observation, codeword A has a Hamming distance of three to the other four codewords. Each of the remaining four codewords has a Hamming distance of two to each other, meaning that, for example, codeword B has a smaller Hamming distance to codeword C than codeword A has to codeword C and that codewords B and C have different distance spectra. The difference indicates that codeword A has greater protection against the effects of distortion and noise in the telecommunication channel relative to the other codewords than they do relative to each other. For example, in a telecommunication signal transmitter across a telecommunication channel subject to additive Gaussian white noise (AGWN) using BPSK, codeword A has 1.5 dB of additional protection than any of the other four codewords have relative to each other. In other words, codeword A is less likely to be confused with the other four codewords after having been distorted by the telecommunication channel than the other four codewords would be because they have the same Hamming distance to each other.

The rate of a non-linear block code that has the five codewords A-E above is $\log_2(5)/4=0.58$. A linear (7,4) Hamming code exists that has a Hamming distance of 3 between the codewords and has a code rate of $4/7=0.57$. The linear code provides less protection to the codewords than the non-linear block code provides to codeword A at the same Hamming distance (3). Also, the linear code uses seven coded bits rather than the four coded bits of the non-linear code. Because of this, the various implementations of non-linear block codes disclosed in this document may enable transmission of Mod-Cods with less overhead. Overhead reduction may additionally be accomplished in particular implementations by selecting the non-linear block code that has just a desired number of codewords. Since in linear block codes, the number of codewords is a power of two, in the example above, the linear (7,4) Hamming code has $2^4$ or sixteen codewords in comparison with the five codewords A-E of the non-linear block code. Because five instead of sixteen codewords are used, an overhead savings of three bits per preamble results, in addition to the greater protection given to codeword A.

The unequal protection of codewords or the difference in strength of the codewords caused by the differences in distance spectra of the codewords in a non-linear block code may be used in particular implementations to allow for unequal protection of the information conveyed using the telecommunication signal. For example, in particular implementations, the most important or most commonly required information could be transmitted using the strongest codeword. In these implementations, the codewords become control codewords that are used to transmit the information. These control codewords contain parameters, data, or other values used to facilitation information storage, transmission, and/or retrieval. An example of a control codeword is a ModCod, when it is associated with or included in a codeword. Where ModCods are used to indicate the modulation and code parameters needed to decode the data payloads of the frames in the telecommunication signal, the strongest codeword could be assigned to the strongest ModCod in particular implementations, and vice versa. The remaining codewords (control codewords) of the particular non-linear block code could be assigned to the ModCods that are not as strong. In such implementations of telecommunication block codes, the ModCods may have two, three, or more levels of protection because of desired differences in the strength of the codewords to which they are assigned. A wide variety of combinations of codeword strength and ModCod strength are possible using the principles disclosed in this document. Because of these principles, a number of implementations of various methods involving telecommunication block codes exist, and are further disclosed in this document.

Figure 4:
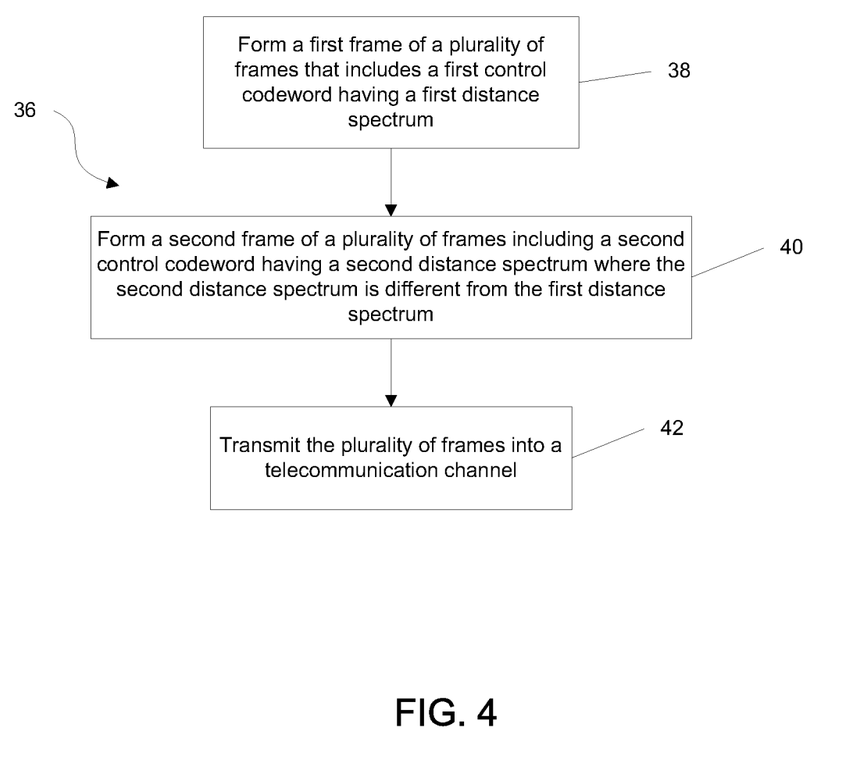
FIG. 4 is a flowchart of an implementation of a first method of transmitting and recovering data modulated onto a carrier wave traversing a telecommunication channel.

Referring to FIG. 4, an implementation of a first method of transmitting and recovering data traversing a telecommunication channel 36 is illustrated. As illustrated, the method 36 may include forming a first frame of a plurality of frames that each include a first control codeword having a first distance spectrum (step 38), forming a second frame of a plurality of frames that each include a second control codeword having a second distance spectrum where the second distance spectrum is different from the first distance spectrum (step 40), and transmitting the plurality of frames into a telecommunication channel (step 42). The difference in distance spectra could result from the use of a non-linear block code or any other block code type with varying sets of Hamming distances between a codeword and the rest of the codewords of the block code. Various methods of recovering the data using the control codeword with a receiver or receiver module or process may be utilized in various implementations of the method 36. The control codewords used in the method 36 could be any disclosed in this document.

Figure 5:
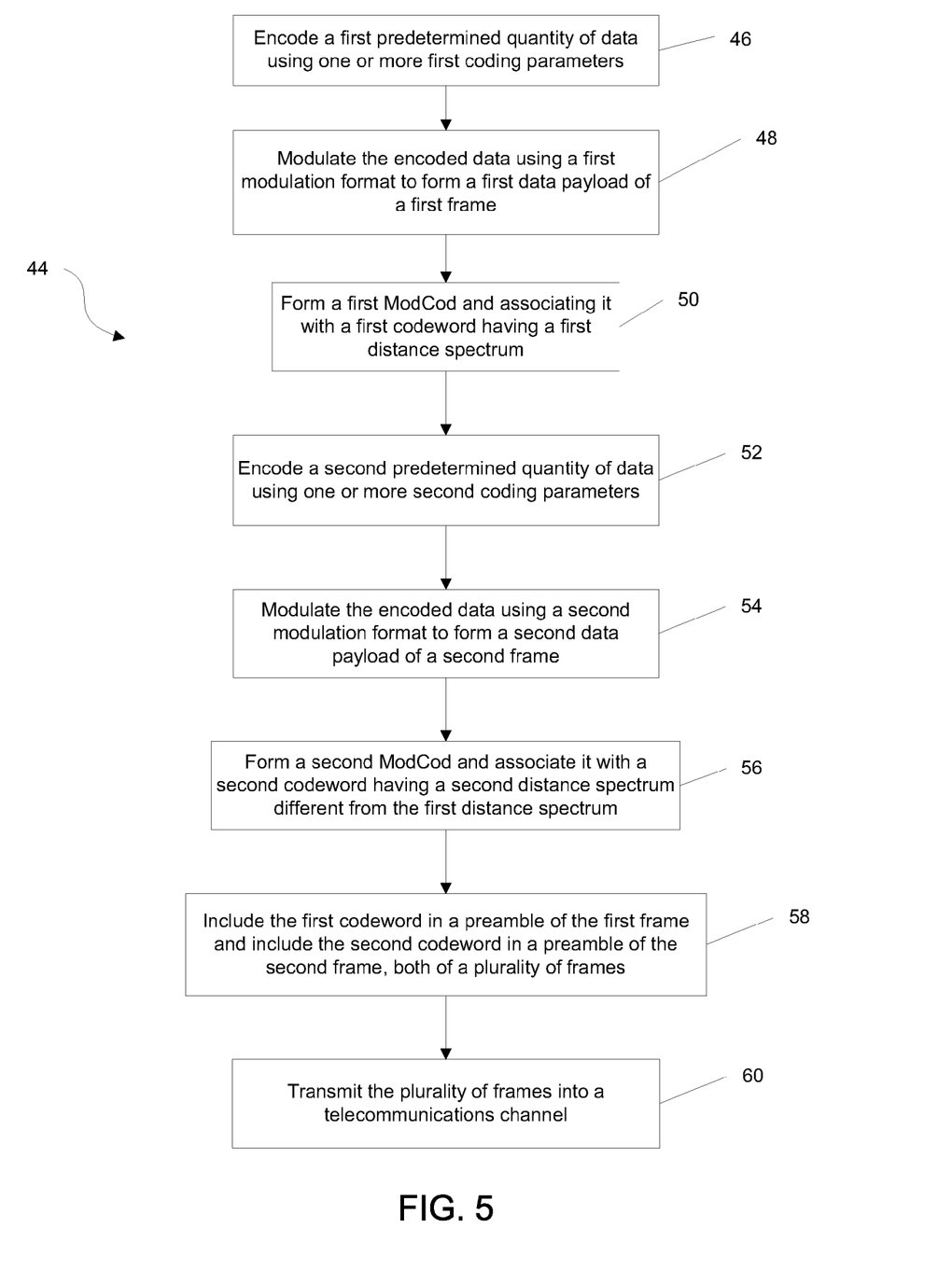
FIG. 5 is a flowchart of an implementation of a second method of transmitting and recovering data modulated onto a carrier wave traversing a telecommunication channel.

Referring to FIG. 5, an implementation of a second method of transmitting and recovering data modulated onto a carrier wave traversing a telecommunication channel 44 is illustrated. The method 44 may include encoding a first predetermining quantity of data using one or more first coding parameters (step 46). These coding parameters may be various FEC parameters or other code parameters from another code type. The method 44 may also include modulating the encoded data using a first modulation format to form a first data payload of a first frame (step 48). The modulation format used may be any disclosed in this document. The method 44 may also include forming a first ModCod using some or all of the code parameters and information relating to the first modulation format and associating the ModCod with a first codeword having a first distance spectrum (step 50). The method 44 may include encoding a second predetermined quantity of data using one or more second coding parameters (step 52), modulating the encoded data using a second modulation format to form a second data payload of a second frame (step 54), and forming a second ModCod and associating the second ModCod with a second codeword having a second distance spectrum different from the first distance spectrum (step 56). The second codeword may be stronger or weaker than the first codeword. The method 44 may also include including the first codeword in a preamble of the first frame and including the second codeword in a preamble of the second frame where the first frame and the second frame are both part of a plurality of frames (step 58) and transmitting the plurality of frames into a telecommunications channel (step 60). A wide variety of methods of recovering the data using the information in the first and second ModCods with a receiver may be used in various implementations of the second method 44.

Figure 6:
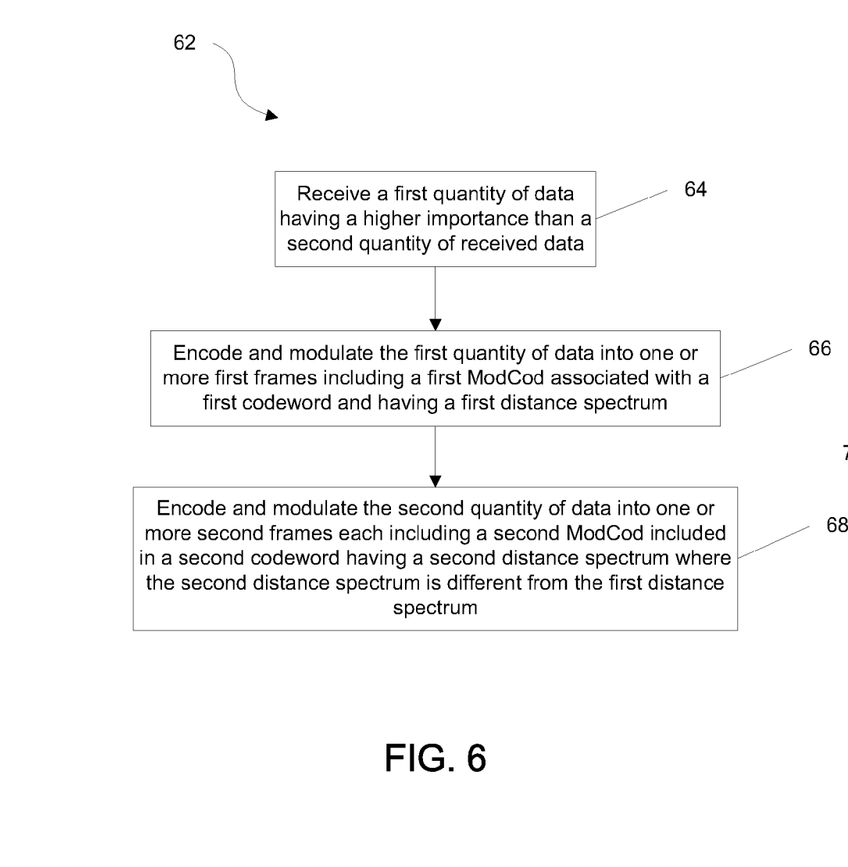
FIG. 6 is a flowchart of an implementation of a method of unequally protecting data transmitted across a telecommunication channel.

Referring to FIG. 6, implementations of telecommunication block codes like those disclosed in this document may be utilized in implementations of a method of unequally protecting data transmitted across a telecommunication channel 62. As illustrated, the method 62 may include receiving a first quantity of data having a higher importance than a second quantity of received data (step 64). The data with a higher importance may have a higher importance because, by non-limiting example, it is needed most frequently, is needed to decode a frame of particular importance, contains additional information (beyond a ModCod) that may be used for a particular purpose (like data in side channel, as will be subsequently discussed), or may be arbitrarily assigned greater importance. The method 62 may further include encoding and modulating the first quantity of data into one or more first frames including a first ModCod that is associated with a first codeword having a first distance spectrum (step 66) and encoding and modulating the second quantity of data into one or more second frames each including a second ModCod included in a second codeword having a second distance spectrum dfferent from the first distance spectrum (step 68). In particular implementations, the first ModCod and the second ModCod may have a first strength and a second strength, respectively, and the first strength of the first ModCod may be equal to, greater than, or less than the second strength of the second ModCod.

Figure 7:
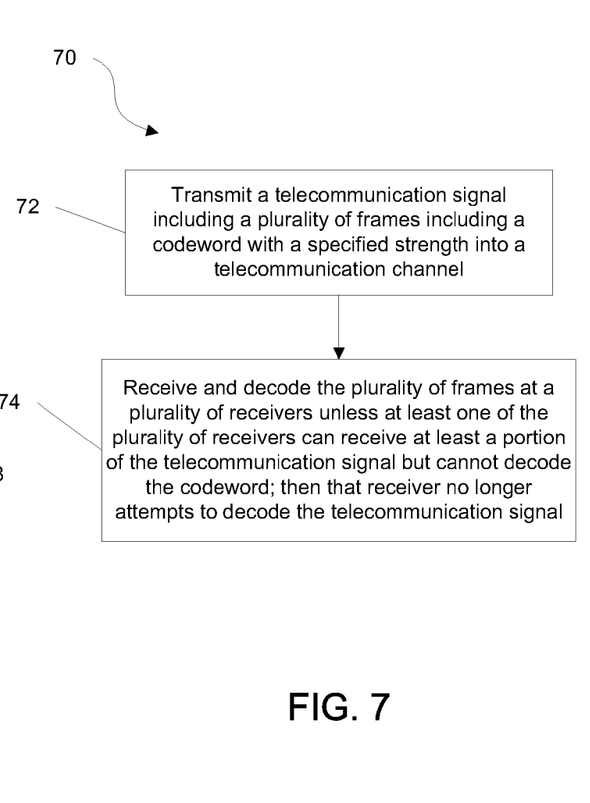
FIG. 7 is a flowchart of an implementation of a method of reducing transmission and reception overhead between a transmitter and a plurality of receivers.

Referring to FIGS. 3 and 7, implementations of telecommunication block codes like those disclosed in this document may be utilized in implementations of a method of reducing transmission and reception overhead between a transmitter and a plurality of receivers 70. The method 70 may include transmitting a telecommunication signal including a plurality of frames each including a codeword with a specified strength into a telecommunication channel (step 72) and receiving and decoding the plurality of frames at a plurality of receivers unless at least one of the plurality of receivers can receive at least a portion of the telecommunication signal but cannot decode the codeword; then that receiver no longer attempts to decode the telecommunication signal (step 74). The inability to decode the codeword can result from the effects of noise, distortion, and/or corruption caused as the telecommunication signal passes through the telecommunication channel. Because the receiver that cannot decode the signal no longer attempts to decode it, the computational/receiving overhead of the receiving side may be reduced. In addition, the power and/or bandwidth requirements of the transmission side may be reduced because only the power or bandwidth needed to get the signal to the desired one or more receivers of the plurality of receivers is what is used, not what would ordinarily be required to transmit a particular telecommunications signal to all of the plurality of receivers.

In particular implementations of the method 70, a codeword of a specified strength sufficient to be decoded by each of the plurality of receivers may be included in a transmission; in these implementations, a user of the system may utilize the telecommunication block code implementation to ensure that all of the receivers get a particular signal. In other implementations of the method 70, the strength of the ModCod may be varied either independently from the strength of the codeword or along with the strength of the codeword to ensure that all of the receivers are able to receive and decode the plurality of frames included in the telecommunication signal.

An example of a mapping of codewords to ModCods is illustrated below:

BPSK, rate ½ FEC→A) 0000
QPSK, rate ½ FEC→B) 1110
QPSK, rate ⅔ FEC→C) 0111
QPSK, rate ¾ FEC→D) 1011
QPSK, rate 9/10 FEC→E) 1101

Referring to FIG. 3, because the distance and/or transmission characteristics of the telecommunication channels between the satellite and each of the plurality of receivers vary, the average quality of the transmission between the satellite and each of the plurality of receivers varies. When the transmission quality is known, when a transmission is intended for a certain number of the receivers who have a higher known level of transmission quality between the satellite (hub) and receiver (spoke), then a lower strength codeword C (i.e., one with a distance spectrum with a smaller minimum Hamming distance) could be broadcast in the telecommunication signal, followed by the data modulated and encoded in rate ⅔ QPSK. While each of the plurality of receivers may be able to receive at least a portion of the telecommunication signal (i.e., they may be able to detect some signal), because those of the plurality of receivers that cannot decode the codeword stop attempting to do so, only those receivers with sufficient transmission or link quality will continue to receive the signal. This means that the satellite will also not have to broadcast using the lowest rate code that enables all of the receivers to successfully decode the telecommunication signal. This reduces transmission overhead, and may also allow for the elimination of the use of software controls that would otherwise be required to prevent a receiver from decoding a signal that was coming in at a low enough rate for it to decode but that it should not have access to.

The converse situation is also true—the strongest codeword and/or the codeword associated with a ModCod of sufficient strength could also be sent to ensure that each of the plurality of receivers is able to decode the telecommunication signal being sent. In the example above, instead of sending codeword C, A or B could be used. Since the receivers can decode the codeword, they can also be assured that they can decode the rest of the frame information included in the telecommunication signal using the ModCod parameters.

In particular implementations, all of the frames being sent from the transmitter to the plurality of receivers may be of equal length (in either symbols or bits). In particular implementations, if one or more of the plurality of receivers cannot decode the codeword of a particular frame (due to corruption of the frame caused by interference in the telecommunication channel), in implementations of the method, the one or more of the plurality of receivers may attempt to decode the codeword of a subsequent frame. Because all of the frames are the same length, the one or more of the plurality of receivers may not need to resynchronize before attempting to decode the subsequent frame. The subsequent frame may be the next frame received in particular implementations; in others, the subsequent frame may be several frames from the frame where the decoding attempt failed. Which subsequent frame is selected for decoding may be determined in particular implementations by analyzing one or more characteristics of the telecommunication signal received at the time the subsequent frame was received. Because all of the frames have the same length, however, frame synchronization can be maintained by the receiver with the transmitter while a subsequent frame is being selected and decoded following a decoding failure.

In various implementations of telecommunications systems like those disclosed in this document, a side channel may be utilized to transfer information relating to, by non-limiting example, channel estimates, link quality metrics, signal-to-noise ratios (SNR), error rates, signal strength, or any other parameter of the telecommunication system. The side channel may be transmitted through the same telecommunication channel that the data passes through, or may be transmitted via another telecommunication channel. For example, in implementations of telecommunication systems that utilize Adaptive Coding and Modulation (ACM), the information needed to change the code parameters and modulation format in response to changes in the transmission characteristics of the telecommunication channel is sent using a side channel.

Figure 8:
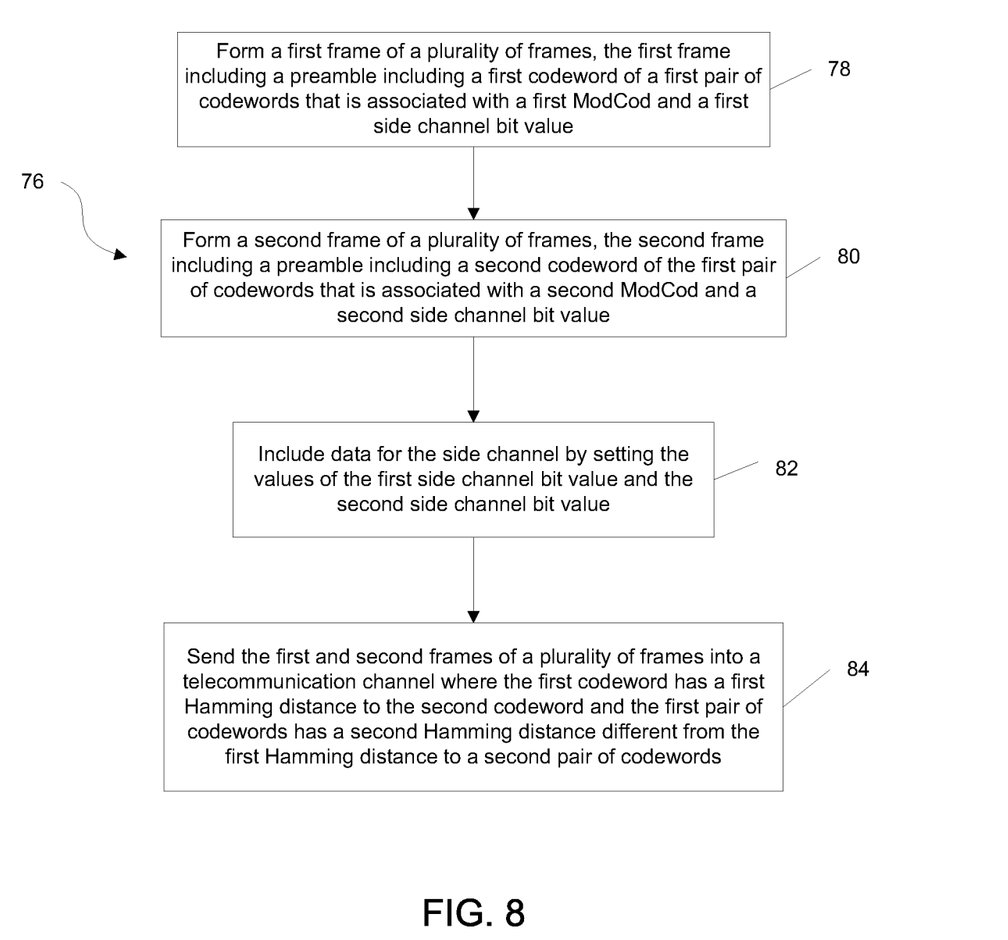
FIG. 8 is a flowchart of an implementation of a method of transmitting data for a side channel across a telecommunication channel.

Implementations of telecommunication systems like those disclosed in this document may transmit data across a side channel using implementations of telecommunication block codes disclosed herein. The transmission may be accomplished by adding one or more additional information bits to the preamble, specifically within the codeword included in the preamble. In particular implementations, paired codewords from a non-linear block code that include the one or more extra bits within them may be used. Such paired codewords may be used by various implementations of a method of transmitting data for a side channel across a telecommunication channel. Referring to FIG. 8, an implementation of such a method 76 is illustrated. As illustrated, the method 76 may include forming a first frame of a plurality of frames where the first frame includes a preamble including a first codeword of a first pair of codewords that is associated with a first ModCod and a first side channel bit value (step 78). The method 76 may also include forming a second frame of a plurality of frames where the second frame includes a preamble including a second codeword of the first pair of codewords that is associated with a second ModCod and a second side channel bit value (step 80). The method 76 may further include including data for the side channel by setting the values of the first side channel bit value and the second side channel bit value (step 82) and sending the first and second frames of a plurality of frames into a telecommunication channel where the first codeword has a first Hamming distance to the second codeword and the first pair of codewords has a second Hamming distance different from the first Hamming distance to a second pair of codewords (step 84). Implementations of the method 76 may utilize any of a wide variety of methods to recover the data for the side channel from the first side channel bit value and the second side channel bit value.

Any of a wide variety of telecommunication block code implementations may be utilized in implementations of the method 76. As an example, the following mapping of paired codewords with modulation format types can be constructed.

BPSK, rate ½ FEC→A 00000 $\overline{A}$ 11000
QPSK, rate ½ FEC→B 01110 $\overline{B}$ 10110
QPSK, rate ⅔ FEC→C 10101 $\overline{C}$ 01101
QPSK, rate ¾ FEC→D 10011 $\overline{D}$ 01011
QPSK, rate 9/10 FEC→E 00111 $\overline{E}$ 11111

The pair of codewords A and $\overline{A}$ have a Hamming distance of three to all of the other codeword pairs but a Hamming distance of two from each other. Because of this, A is more likely to be erroneously decoded as $\overline{A}$ when used for a side channel bit value than any of the other codewords in the other codeword pairs. If A was erroneously decoded as $\overline{A}$, the side channel bit value would be lost, but the ModCod information contained in the codeword is unchanged, allowing the data in the data payload of the frame to be correctly decoded. When A and $\overline{A}$ are correctly decoded when acting as a side channel bit values, they can be used to carry data for the side channel. In this example, a non-linear block code with ten codewords is split in half to form five pairs of codewords, each of which is associated with a particular ModCod. A result of this arrangement is that the side channel bit value is protected with a different strength, or different Hamming distance, than the ModCod values themselves, since the Hamming distance between paired codewords is different than the Hamming distance between codeword pairs.

While in the foregoing example, all of the pairs of codewords have the same distance between pairs and also have the same distance between paired codewords within a pair, in other implementations, many variations of distances between codeword pairs and between codewords within a pair may be utilized. In particular implementations, proper selection of the Hamming distance between codeword pairs may allow recovery of the values of the side channel bit values even when the ModCod values in the codewords cannot be decoded, and vice versa. This situation may occur, for example, when the Hamming distance between all codewords having a side channel bit value of 0 (or −1, if negated) is greater than the Hamming distance of codewords having a side channel bit value of 1. In some implementations, the Hamming distance between paired codewords may be larger than the Hamming distance between codeword pairs; in these implementations, the side channel bit value is protected more strongly than the corresponding ModCod, assuming that different ModCods are assigned to different codeword pairs. In other implementations, the Hamming distance between paired codewords may be smaller than the Hamming distance between codeword pairs; in these implementations, the ModCod values are protected more strongly than the side channel bit values. In still other implementations, a first codeword pair and a second codeword pair may be selected from a set of codeword pairs of a non-linear block code where one or more paired codewords in the set has a Hamming distance between one or more of the paired codewords that is larger than a Hamming distance between codeword pairs and where one or more paired codewords in the set has a Hamming distance between one or more of the paired codewords that is smaller than a Hamming distance between codeword pairs. In these implementations, the set of codeword pairs may include a plurality of codeword pairs, each with a different Hamming distance between codewords and a different Hamming distance between codeword pairs. In these implementations, this may be referred to as the paired codewords having different distance spectra within the pairs and different distance spectra between the pairs. These implementations may be useful because the degree of protection of the side channel bit and degree of protection of the ModCod can be selected as desired from within the same non-linear block code implementation.

Figure 9:
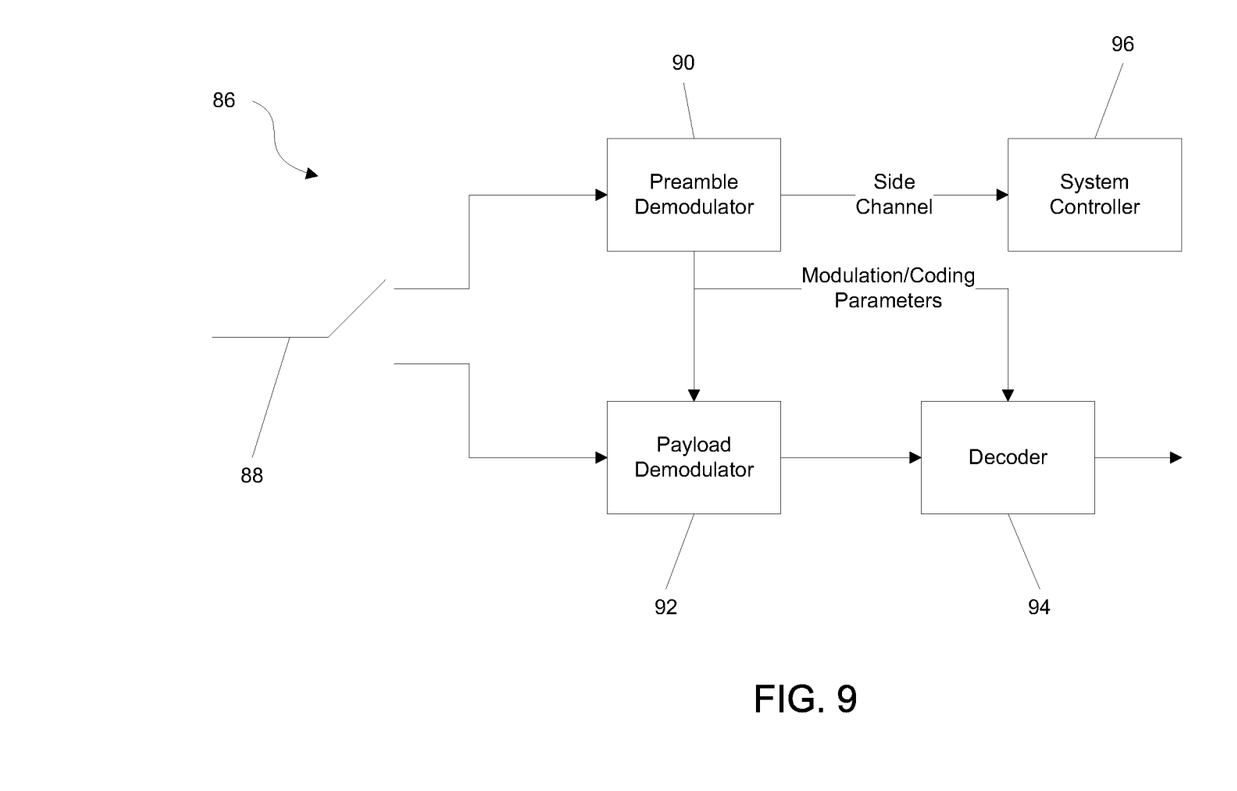
FIG. 9 is a block diagram of a receiver implementation capable of recovering data included in a side channel.

Implementations of telecommunication systems that utilize implementations of a method of transmitting data for a side channel across a telecommunication channel may take a wide variety of forms and contain a wide variety of components. Referring to FIG. 9, an implementation of a demodulator portion of a receiver of a telecommunication system implementation 86 is illustrated. Modulated and encoded frame data enters the demodulator at switch (commutator) 88. Initially, switch 88 passes the frame data to a preamble demodulator 90, which demodulates and decodes the preamble information using a predetermined standard modulation type and set of code parameters. The preamble demodulator 90 uses the codeword in the preamble to retrieve the ModCod and the side channel bit value and sends the corresponding modulation/coding parameters from the ModCod to the payload demodulator 92 and the decoder 94 and the data for the side channel along the side channel to the system controller 96. Once the modulation/coding parameters have been sent to the payload demodulator 92 and decoder 94, the switch 88 sends the data payload of the frame to the payload demodulator for demodulation and decoding to allow for recovery of the data in the data payload. The system controller 96 uses the data in the side channel for various system and/or telecommunication channel control processes.

The implementations of telecommunication block codes disclosed in this document may be used in frames with constant or variable block sizes. They may also be used in ACM, Variable Coding and Modulation (VCM), and Constant Coding and Modulation (CCM) system implementations. A wide variety of other system and method implementations are possible using the principles disclosed in this document.

In places where the description above refers to particular implementations of telecommunication block codes and telecommunications systems, it should be readily apparent that a number of modifications may be made without departing from the spirit thereof and that these implementations may be applied to other telecommunication block code and/or telecommunication system implementations.

The invention claimed is:

1. A method of transmitting and recovering data traversing a telecommunication channel, the method comprising:

forming a first frame of a plurality of frames using a frame module, the first frame comprising a first control codeword including information relating to a first format used for a first data payload included in the first frame, the first control codeword selected from a non-linear block code and having a first distance spectrum that is sufficient to be decodable by a receiver at a minimum signal to noise ratio at which the first data payload is also decodable by the receiver;

forming a second frame of the plurality of frames using the frame module, the second frame having a same frame duration as the first frame and comprising a second control codeword including information relating to a second format used for a second data payload included in the second frame, the second control codeword selected from the non-linear block code and having a second distance spectrum that is sufficient to be decodable by the receiver at a minimum signal to noise ratio at which the second data payload is also decodable by the receiver, and wherein the second distance spectrum is different from the first distance spectrum and the first control codeword is at least as strong as the first data payload and is weaker than the second data payload and the second control codeword is at least as strong as the second data payload; and transmitting the plurality of frames into a telecommunication channel using a frame transmission module.

2. The method of claim 1, wherein forming a second frame of the plurality of frames further comprises wherein the first distance spectrum has a minimum Hamming distance that is shorter than the minimum Hamming distance of the second distance spectrum.

3. The method of claim 1, further comprising:
receiving the plurality of frames with a receiver module; and
recovering the data from the first data payload and the second data payload using the first control codeword and the second control codeword, respectively, and using a retrieval module.

4. A method of transmitting and recovering data modulated onto a carrier wave traversing a telecommunication channel, the method comprising:
forming a first frame and a second frame of equal frame duration of a plurality of frames by:
encoding a first predetermined quantity of data using one or more first coding parameters and an encoder to form a first encoded quantity of data;
modulating the first encoded quantity of data using a first modulation format and a modulator to form a first data payload included in the first frame of the plurality of frames;
forming a first modulation/code pair (ModCod) including information relating to the one or more first coding parameters and the first modulation format used to encode the first predetermined quantity of data in the first data payload and associating the first ModCod with a first control codeword of a non-linear block code, the first codeword having a first distance spectrum that is sufficient to be decodable by a receiver a minimum signal to noise ratio at which the first data payload is also decodable by the receiver;
encoding a second predetermined quantity of data using one or more second coding parameters and the encoder to form a second encoded quantity of data;
modulating the second encoded quantity of data using a second modulation format and the modulator to form a second data payload included in the second frame of the plurality of frames;
forming a second ModCod including information relating to the one or more second coding parameters and the second modulation format used to encode the second predetermined quantity of data in the second data payload and associating the second Mod Cod with a second codeword of the non-linear block code, the second codeword having a second distance spectrum different from the first distance spectrum and sufficient to be decodable by the receiver at a minimum signal to noise ratio at which the second frame is decodable by the receiver, wherein the first codeword is at least as strong as the first data payload and is weaker than the second data payload and the second codeword is at least as strong as the second data payload; and transmitting the plurality of frames into a telecommunication channel using a transmitter.

5. The method of claim 4, wherein forming the second ModCod further comprises wherein the second ModCod has a strength that greater than a strength of the first ModCod.

6. The method of claim 4, wherein forming the second ModCod further comprises wherein the first distance spectrum has a minimum Hamming distance smaller than a minimum Hamming distance of the second distance spectrum.

7. The method of claim 4, further comprising:
receiving the plurality of frames with a receiver; and
recovering the data from the first data payload and the second data payload using the first codeword and the second codeword, respectively, and using a demodulator and a decoder.

8. A method of unequally protecting data transmitted across a telecommunication channel, the method comprising:
receiving a first quantity of data and a second quantity of data, the first quantity of data having a higher importance than the second quantity of data;
encoding and modulating, using an encoder and modulator, the first quantity of data into one or more first frames each comprising a first modulation/code pair (ModCod) having a first strength, the first ModCod associated with a first codeword of a non-linear block code, the first codeword having a first distance spectrum that is sufficient to be decodable by a receiver at a minimum signal to noise ratio at which the first quantity of data is also decodable by a receiver;
encoding and modulating, using an encoder and modulator, the second quantity of data into one or more second frames each having a same frame duration as the one or more first frames and each comprising a second ModCod having a second strength, the second ModCod associated with a second codeword of the non-linear block code, the second codeword having a second distance spectrum that is sufficient to be decodable by the receiver at a minimum signal to noise ratio at which the second quantity of data is decodable by the receiver and wherein the first distance spectrum is different from the second distance spectrum and wherein the first codeword is at least as strong as the first quantity of data and is weaker than the second quantity of data and the second codeword is at least as strong as the second quantity of data.

9. The method of claim 8, wherein encoding and modulating, using the encoder and modulator, the second quantity of data into one or more second frames further comprises wherein the first strength of the first ModCod is less than the second strength of the second ModCod.

10. The method of claim 8, wherein encoding and modulating, using the encoder and modulator, the second quantity of data into one or more second frames further comprises wherein a minimum Hamming distance of the first distance spectrum is smaller than a minimum Hamming distance of the second distance spectrum.

11. A method of reducing transmission and reception overhead between a transmitter and a plurality of receivers, the method comprising:
   transmitting a telecommunication signal comprising a plurality of frames each having a same frame duration into a telecommunication channel using a transmitter, each of the plurality of frames comprising a codeword having a specified strength at least equal to a strength of a data payload of each respective frame from a set of codewords of a non-linear block code, wherein a first frame has a first codeword that is at least as strong as a data payload of the first frame and is weaker than a data payload of a second frame and a second codeword is at least as strong as the data payload of the second frame; and
   receiving and decoding the plurality of frames at a plurality of receivers;
   wherein when at least one of the plurality of receivers can receive at least a portion of the telecommunication signal but cannot decode the codeword because of distortion or corruption of the codeword caused by the telecommunication channel, the at least one receiver no longer attempts to decode the telecommunication signal.

12. The method of claim 11, further comprising:
   transmitting a second telecommunication signal comprising a plurality of frames into the telecommunication channel using the transmitter, each of the plurality of frames comprising a second codeword having a specified strength stronger than the first codeword; and
   enabling all of the plurality of receivers to receive and decode the plurality of frames by specifying that the strength of the second codeword be sufficient to allow all of the plurality of receivers to receive and decode the second codeword, notwithstanding any distortion or corruption of the telecommunication signal caused by the telecommunication channel.

13. The method of claim 11, further comprising:
   transmitting a second telecommunication signal comprising a plurality of frames into the telecommunication channel using the transmitter, each of the plurality of frames comprising a modulation/code pair (ModCod) associated with a second codeword, the ModCod having a specified strength stronger than a ModCod associated with the first codeword; and
   enabling all of the plurality of receivers to receive and decode the plurality of frames by ensuring that the ModCod included in the second codeword has a sufficient strength to allow all of the plurality of receivers to receive and decode the plurality of frames, notwithstanding any distortion or corruption of the telecommunication signal caused by the telecommunication channel.

14. The method of claim 11, wherein each of the plurality of frames has an equal length and wherein receiving and decoding the plurality of frames at the plurality of receivers further comprises wherein if the at least one of the plurality of receivers cannot decode the codeword in a received frame because of distortion or corruption of the codeword caused by the telecommunication channel, the at least one receiver no longer attempts to decode that received frame but attempts to decode a subsequent received frame of the plurality of frames.

15. The method of claim 11, wherein each of the plurality of frames has an equal length and wherein receiving and decoding the plurality of frames at the plurality of receivers further comprises maintaining frame synchronization with the plurality of frames using the equal length of each of the plurality of frames and attempting to decode a subsequent received frame of the plurality of frames when the at least one of the plurality of receivers cannot decode the codeword in a received frame because of distortion or corruption of the codeword caused by the telecommunication channel.

16. A method of transmitting data for a side channel across a telecommunication channel, the method comprising:
   forming a first frame of a plurality of frames using an encoder and a modulator, the first frame comprising a first modulation/code pair (ModCod) including information relating to first coding parameters and a first modulation format used to encode and modulate a first data payload included in the first frame, the first ModCod and a first side channel bit value associated with a first codeword of a first pair of codewords of a non-linear block code, wherein the first codeword has a first distance spectrum sufficient to be decodable by a receiver at a minimum signal to noise ratio at which the first data payload is decodable by the receiver;
   forming a second frame of the plurality of frames using the encoder and the modulator, the second frame having a same frame duration as the first frame and comprising a second ModCod including information relating to second coding parameters and a second modulation format used to encode and modulate a second data payload included in the second frame, the second ModCod and a second side channel bit value associated with a second codeword of the first pair of codewords of the non-linear block code, wherein the second codeword has a second distance spectrum that is sufficient to be decodable by the receiver at a minimum signal to noise ratio at which the second data payload is decodable by the receiver and wherein the first codeword is at least as strong as the first data payload and is weaker than the second data payload and the second codeword is at least as strong as the second data payload;
   including data for the side channel by setting the value of the first side channel bit value and the value of the second side channel bit value, respectively; and
   sending the plurality of frames into a telecommunication channel using a transmitter;
   wherein the first codeword has a first Hamming distance to the second codeword and the first pair of codewords has a second Hamming distance to a second pair of codewords of the non-linear block code where the second Hamming distance is different from the first Hamming distance.

17. The method of claim 16, further comprising recovering data for the side channel by retrieving the value of the first side channel bit value and the value of the second side channel bit value from the first codeword and from the second codeword, respectively, using a receiver.

18. The method of claim 16, wherein forming the first frame of the plurality of frames and forming the second frame of the plurality of frames further comprise wherein the second Hamming distance is larger than the first Hamming distance.

19. The method of claim 16, wherein forming the first frame of the plurality of frames and forming the second frame of the plurality of frames further comprise wherein the second Hamming distance is smaller than the first Hamming distance.

20. The method of claim 16, wherein forming the first frame of the plurality of frames and forming the second frame of the plurality of frames further comprises selecting the first codeword and the second codeword from a set of codeword pairs where one or more of the codeword pairs in the set has a Hamming distance between paired codewords that is larger than a Hamming distance between codeword pairs and where one or more of the codeword pairs in the set has a Hamming distance between paired codewords that is smaller than a Hamming distance between codeword pairs.

* * * * *